Patented May 20, 1952

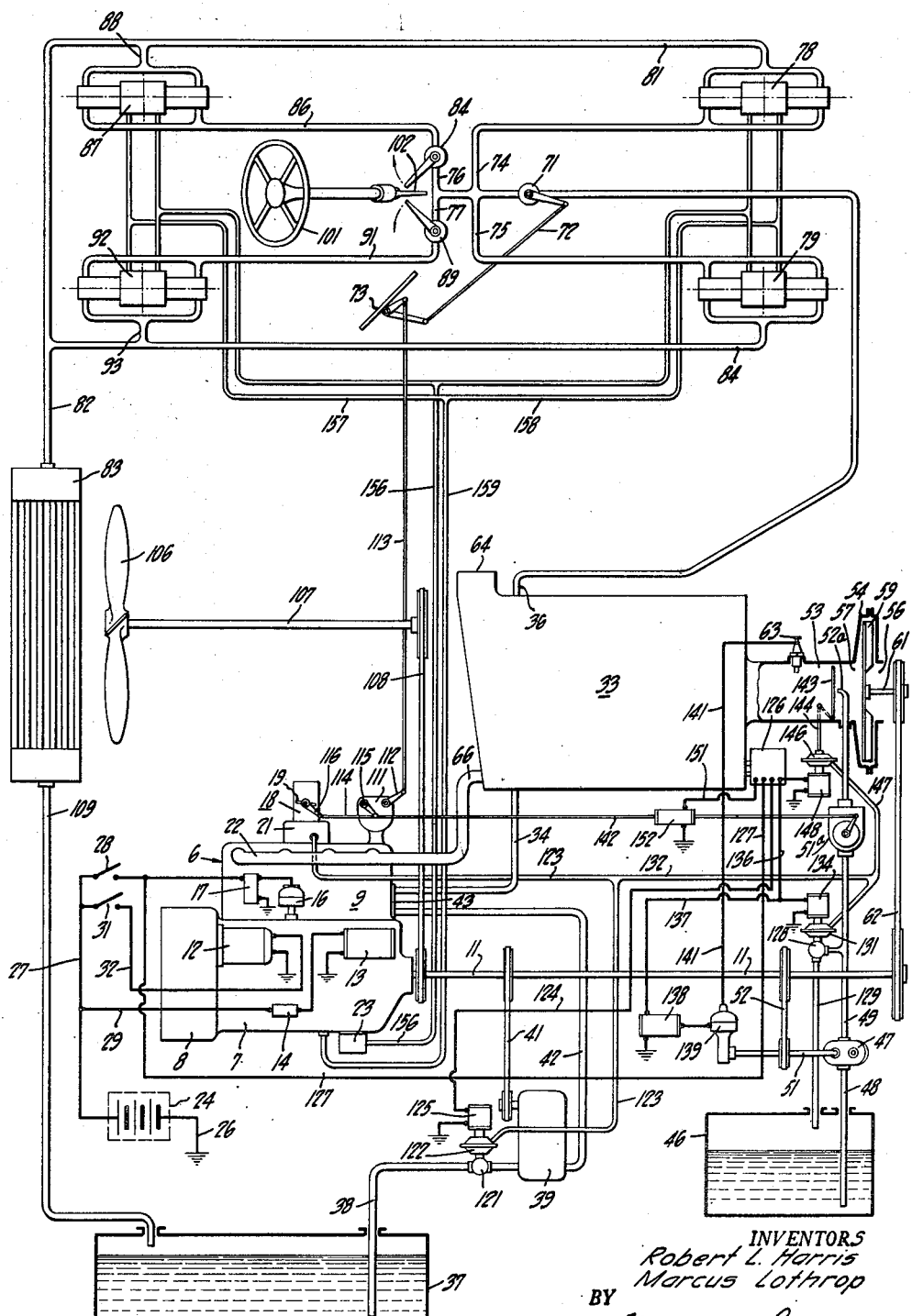

2,596,968

UNITED STATES PATENT OFFICE 2,596,968

STEAM POWER PLANT

Robert L. Harris and Marcus Lothrop, Berkeley, Calif., assignors to Yuba Manufacturing Company, San Francisco, Calif., a corporation of California Application May 1, 1948, Serial No. 24,656

12 Claims. (Cl. 60—105)

Our invention relates to steam power plants of a portable or automotive nature and is especially concerned with providing improvements in general to power plants of this type.

While steam as a source of propulsive effort for automotive uses has long been known and has many well recognized advantages, there are also a great number of disadvantages. The adverse balance has been so great as to preclude extensive commercial use of this type of prime mover. Various attempts have been made from time to time to alleviate or overcome the adverse conditions but without great success. One of the difficulties is that a portable plant must carry all of its water and the amount is so great as to necessitate virtually complete condensation and reuse of the fluid if there is to be protracted running. Another is the difficulty of bringing a portable plant to operating temperature or condition within a satisfactorily short time. Another difficulty is in providing a sufficiently high efficiency so that the steam plant can be generally competitive with other available systems. All of these disadvantages together with some other less important ones seem to resolve themselves into a lack of sufficiently great and readily available auxiliary power. Some years ago many of these difficulties were in part overcome by the Dobles (John, Warren, Abner, William A., Sr., and William A., Jr.) as shown is sundry United States patents issued to them and largely predicated upon the use of an electric storage battery to furnish auxiliary power. Even so, the capacity of a sizable storage battery is extremely limited and the efficiency of the electrical auxiliary system including a steam driven generator, a battery and a motor is quite low.

It is, therefore, an object of our invention in general to provide an improved steam power plant.

Another object of the invention is to provide a steam power plant having an adequate supply of auxiliary power.

A further object of the invention is to provide a relatively efficient and quickly responsive source of auxiliary power, and correspondingly a relatively efficient and quickly responsive power plant.

An additional object of the invention is to provide controls or interrelating mechanisms for governing the operation of a steam power plant quickly and virtually automatically despite wide fluctuations in demand.

An additional object of the invention is to provide means for increasing the efficiency of operation and of response of a steam power plant.

Other objects together with the foregoing are attained in the steam power plant described in the accompanying description and illustrated in the accompanying drawing, in which the figure is a diagrammatic representation of a steam power plant arranged and constructed as part of a vehicle in accordance with our invention, most of the parts being shown by conventional or readily identifiable symbols and some parts being disclosed in cross-section.

While the steam power plant of our invention can be incorporated in numerous different ways and forms depending entirely or largely upon the desired operating characteristics and the particular environment in which it is to be utilized, it has been successfully incorporated substantially in the form shown in the accompanying drawing.

In this embodiment the steam power plant is especially designed for use as part of a tractor for operation, both on and off the highways. This vehicle has four pneumatically tired wheels each one being driven and the front two being steered through relatively wide angles. The size of the power plant is approximately or nominally two-hundred horse-power.

In this steam power plant the auxiliary power for the steam plant itself and in fact virtually all of the power needed on the vehicle for various purposes such as providing pressure air for brake operation or driving steering devices or otherwise, is accomplished by means other than steam, the steam being reserved solely or almost entirely for use in propelling the vehicle. To supply such auxiliary power, there is provided a conventional internal combustion engine 6 having a capacity in the neighborhood of twenty per cent of the nominal horse-power of the vehicle. This internal combustion engine can be of the aspirating type as shown herein or can as easily be an injection type. Similarly, it can operate on the same fuel used in the steam generator or different fuel. Furthermore, it can be of the water cooled type in which case certain special provisions are made for heat recovery or it can be of the air cooled type in which case other special provisions are made for heat recovery.

Of whatever type, the internal combustion engine 6 is provided with the customary crank case 7, fly-wheel housing 8, cylinder block 9 and drive shaft 11. It is equipped with an electric starter 12 and an electric generator 13 with its attendant cut-out 14. If it is a gasoline engine, it has the conventional ignition breaker and distributor 16 and coil 17. It is illustrated as the aspirating type having a gasoline carburetor 18 equipped with a throttle valve 19 and an intake manifold 21 leading to the several cylinders. An exhaust manifold 22 receives the released products of combustion. As is likewise customary, the engine 6 is equipped with a mechanically driven oil pump 23 for supplying the engine bearing surfaces with the necessary lubricating oil under pressure which normally is returned to or contained in the crank case 7 as a sump.

Associated with the engine in the normal fashion is a standard storage battery 24 of the usual automobile size. This is conveniently a six volt-110 ampere-hour battery having a ground connection 26 and being connected by a conductor 27 to a main switch 28 conveniently under the manual control of the vehicle operator. The battery 24 is supplied with make-up current when the engine is running from the generator 13 acting through the cut-out 14 and a conductor 29 joined to the conductor 27. When the switch 28 is closed, electricity for the ignition is supplied to the breaker and its distributor 16 as well as the coil 17 directly from the storage battery 24 in the usual way. To start the engine, the operator is provided with a starter switch 31 conveniently under his control. This, when closed, completes a circuit from the battery 24 through a conductor 32 to the starter 12 and when the engine has been electrically started, the operator opens the switch 31 in the usual fashion. In starting from cold, the internal combustion engine 6 can initially be started and can be operated alone for a time to warm up, although, since it is of a relatively large size, it is capable of assuming some load immediately it is operating—even under cold conditions. This factor is made use of in order to supply operating power quickly to the steam portion of the power plant.

This includes a generator 33 of any desired type but preferably of the forced circulation or series tube type sometimes, although erroneously, referred to as "semi-flash." In the series tube or forced circulation generator, one tube (or sometimes a very few tubes in parallel) is supplied with relatively cold water at one end and is exposed throughout its length, usually convoluted, to hot gases and so discharges steam, customarily super-heated, at the opposite end. Such a steam making device is preferably termed a "generator" as distinguished from the water-level random circulation type more properly considered a boiler. While a boiler can be utilized, we much prefer to provide a generator 33 and build it with a series tube or forced circulation coil (or a few coils) having an inlet 34 for the cold feed fluid and an outlet 36 for the hot product, for example, super-heated steam.

To supply the generator 33, there is afforded a reservoir 37 conveniently a relatively small tank into which an inlet pipe 38 extends. Water is the usual working fluid in the reservoir 37, although other available liquids can be used. The pipe 38 proceeds to a water pump 39 conveniently of the plunger or positive displacement type. The pump 39 does considerable work and hence is driven at an appropriate rate by a V belt 41 from the drive shaft 11 extending from the engine 6. As the pump 39 is directly connected to the drive shaft 11, it is rotated at all times the engine 6 rotates. This occurs even during starting when the entire load is put on the starter 12. However, the effort necessary to rotate the pump 39 during starting is quite small so that the additional load upon the electric starter 12 is not unduly severe.

Water discharged from the pump 39 is forced through a pipe 42 into a feed water heater 43. This can be of any one of several well recognized types and can even include a jacket around the engine 6 in the event the engine is water cooled. In this case, the feed water absorbs a good deal of the heat from the engine 6. Since in a normal engine roughly a third of the heat energy in the fuel burned is dissipated to the jacket water or to the surrounding air, a supply of waste heat at moderate temperature is available for recovery by the heat exchanger 43. The water under pressure having been heated by the heat exchanger 43, passes into the inlet 34 of the generator and is further heated therein.

In order to supply heat to the generator, we afford a reservoir 46 of fuel, such as a tank of fuel oil of any reasonable grade, for example diesel oil or stove oil. Removal of the oil from the tank is by means of a pump 47 having an inlet pipe 48 extending into the reservoir and a discharge pipe 49 for the pressure oil. The pump 47 is connected to a shaft 51 driven by a V belt 52 from the main engine drive shaft 11. The load on the engine 6 due to the oil pump 47 is very light and even during starting does not impose much of an additional burden upon the electric starter 12. When the engine 6 is operating, the pump 47 is correspondingly driven and supplies fuel oil through the fuel duct 49 and a fuel control valve 51a to a nozzle 52a located at a convenient point within a combustion chamber 53. By this mechanism, a supply of oil is discharged under pressure to spray from the nozzle 52a into the chamber 53.

Simultaneously, a proper supply of air under pressure is afforded by a blower 54 having an atmospheric air opening 56 and a discharge opening 57. In the event the engine 6 is air cooled, the inlet 56 to the air blower is placed directly or by ducts in a position adjacent the engine 6 so that air flowing over the engine into the inlet 56 is warmed and heat is added to the combustion circuit. The blower includes an impeller 59 on a shaft 61 driven by a V belt 62 from the shaft 11. Here again, during starting the load imposed by the blower rotor 59 is relatively light so that the normal electric starter 12 on the engine 6 can assume the slight overload. During normal operation, the horse-power absorbed by the blower 59 is considerable but then it is directly available from the engine 6. A proportioned supply of air and oil is mixed within the chamber 53 and is ignited by a spark plug 63 whereupon combustion ensues. The products of combustion pass through the generator 33 imparting their heat to the water pumped therethrough and discharge as waste gases through the exhaust opening 64.

Conveniently, the heat made available by the process of combustion in the chamber 53 is augmented by heat from the exhaust gases of the engine 6. To this end the exhaust manifold 22 is provided with a discharge pipe 66 leading into a convenient part of the housing of the generator 33. The exhaust gases from the engine 6 are introduced into the generator housing at a location appropriate to their temperature. The amount of heat in the exhaust gases from the engine 6 is roughly thirty per cent of the heat of the fuel burned by the engine. This amount of heat or a proportion of it is added to that available within the generator 33 by burning the fuel from the reservoir 46 so that the efficiency of generation of the steam is increased over what would be possible simply by burning fuel from the reservoir 46 alone. That is, waste heat from the engine 6 exhaust and from the engine 6 jacket water or cooling air is imparted to the gases heating the steam either directly or by heating the generator combustion air.

Steam available in the generator 33 and discharged therefrom through the duct 36 flows through a main throttle valve 71 provided with a control rod 72 extending to a foot pedal 73 conveniently located for the vehicle operator in the customary fashion. Normally the foot pedal 73 is in off position and the throttle 71 is closed and no steam flows. However, when the throttle pedal 72 is depressed, the rod 72 moves the throttle 71 toward open position and steam flows from the pipe 36 into a pair of branches 74 and 75 as well as into a pair of branches 76 and 77. The branch 74 leads to an engine 78 preferably installed immediately adjacent to and steerable with the left front wheel (not shown) of the tractor, the branch 74 including movable connections. Similarly, the pipe 75 extends to an engine 79, immediately associated with the right front wheel of the tractor and freely steerable therewith.

Since the driving engines 78 and 79 are immediately associated with their driven wheels and are steerable therewith, the wheels can move through much greater angles of steering than is customary. The inboard wheel on a turn is rotated about its steering pivot axis as much as ninety degrees. Since the wheel is likewise driven by its connected engine, it exerts its driving force in a direction at right angles to the general direction of the axis of the vehicle. This is useful in maneuvering in cramped quarters and enables the tractor to bulldoze laterally.

Steam exhausted from the engine 78 flows through a flexibly connected exhaust pipe 81 into a conduit 82 leading to a condenser 83. Similarly, steam exhausted from the engine 79 flows through a pipe 84 into the pipe 82 and hence to the condenser 83.

Steam from the inlet branch 76 passes through a valve 84 comparable to a throttle and through a pipe 86 to an engine 87 associated with the left hand rear wheel. Since this wheel is usually not dirigible, the pipe 86 is provided only with sufficient flexibility to accommodate normal wheel movement due to road irregularities. Steam from the engine 87 passes through an exhaust duct 88 into the pipe 81 and thence to the condenser. Similarly, steam from the branch 77 passes through a valve 89 comparable to a throttle and thence through a pipe 91 into its engine 92 associated with the right hand rear wheel. Exhaust from this engine passes through a conduit 93 into the pipe 84 and thence to the condenser 83.

The reason for providing valves 84 and 89 is that the front dirigible wheels, or one of them, may be turned to substantially ninety degrees during sharp maneuvering of the vehicle. If the left hand front wheel, for example, were disposed at ninety degrees to the remainder of the vehicle and even though it were being rotated under its own power by the engine 78, it would also be pushed in the direction of its rotational axis and at right angles to its direction of advance by the engine 87. This conflict in driving forces is resolved by actuation of the appropriate valve 84 when the operator turns the main steering wheel 101 of the tractor. For central zone or moderate amplitude steering, the valve 84 is not actuated but when the turn is of a great angularity, in the neighborhood of fifty degrees to ninety degrees, the projecting arm 102 on the steering wheel being correspondingly actuated is effective to close the valve 84, thus cutting out of operation the engine 87 which under these circumstances is near or substantially at the center of the turning circle. The engine 87 thus provides no propulsive force. The engines 78, 79 and 92 are in the normal vehicle far enough away from the turning center adjacent the engine 87 so that it is permissible to permit them all to drive, the discrepancies in their radii being automatically compensated for by steam flow to the engines. In a special case, other engines can be cut out similarly if the design so requires.

Comparably, when a turn to the right is made and the wheel for the engine 79 approaches a position at right angles to the main axis of the vehicle as a result of the operation of steering wheel 101, the projection 102 eventually actuates the valve 89 first to reduce and then to eliminate steam flow to the engine 92. As the engine is approached by the turning center, its effect is reduced and finally cut out. The engines 87 and 92 are restored to operation as the vehicle is straightened up and the wheel 101 returns to center position by the return of the valves 84 and 89 to open position. With this multiple throttle arrangement, the speed of advance of the vehicle is controlled by the pedal 73 in the usual fashion but the engines are supplied with steam or are deprived of it partially in accordance with the angularity of steering of the vehicle.

The exhaust steam discharged into the condenser 83 is converted to water by a flow of cooling air over the condenser. This is the part of the auxiliary system which requires the greatest power. In order to restore the exhaust steam to liquid condition during excessive or overloaded conditions of operation and under conditions of high atmospheric or ambient air temperatures, the amount of power requisite is very large being comparable to 20 horse-power in relationship to the nominal 200 horse-power of the steam plant. It is for this reason that electrical power or even an exhaust driven steam turbine is hardly feasible for the purpose.

In accordance with our invention, there is provided an air propeller 106 effectively positioned to cause a blast of atmospheric air to blow through the condenser. In practice it is usually more convenient to use several condensers 83 and several fans 106 and they usually are all operated simultaneously although one or more may be cut into and out of the air blowing circuit by simple means. The propeller or fan 106 is mounted on a shaft 107 driven by a V belt 108 from the engine drive shaft 11. During very slow speeds of rotation, the propeller 106 absorbs very little horse-power so that it can easily be rotated even during starting by the electric starter 12. As soon as its speed increases substantially, however, the power absorbed is much larger and is then furnished by the engine 6.

The condenser 83 and the propeller 106 are of a very large size in order to condense substantially all of the steam even under adverse conditions. The output of the condenser is water which flows through a conduit 109 back to the reservoir tank 37 for re-use. It is considered important that very little steam remain uncondensed and be lost to the atmosphere as it is desirable to provide a substantially closed circuit for and indefinitely to recycle the operating fluid. This being the case, the scale deposit in the generator 33, which normally might be excessive, is greatly reduced since only the scale in the initial charge of water and what slight make-up is needed is ever deposited. Furthermore, since the system is substantially closed, it is not necessary to utilize ordinary water. Rather, treated water or a suitable heat transfer liquid such as diphenyl can be utilized. Because of the expense of such fluids, it is not feasible to utilize them if they are discharged after one cycle. Also, since this system is substantially closed, some liquids which might have noxious properties if released in quantities can be appropriately utilized to improve the heat transfer characteristics or the cold weather performance of the system and especially to improve the condensation over what is possible with ordinary water as a working liquid.

In any event the cycle is concluded upon the return of the working fluid in liquid form to the reservoir 37, if desired, by an engine-driven pump which also maintains a vacuum in the condenser 83. The described cycle is the fundamental one and is suitable substantially as described for steady conditions of operation. In a vehicle, however, the demand or load may and usually does fluctuate widely from zero to maximum and with substantially no time lag. Consequently, we provide various controlling devices to adapt the fundamental units to such requirements.

One of the measures taken to make the power plant flexible, that is efficiently and appropriately effective under a wide range in load as distinguished from steady load operation is to equip the engine 6 with a speed responsive governor 111. This governor is a readily available commercial type mechanically driven by the engine 6 and effective to maintain any set speed of engine operation. The governor is provided with a control lever 112 connected by a rod 113 to the pedal 73. Thus, when the operator leaves the pedal 73 in off position, the governor controller 112 is likewise in slow speed or idle or off position. As the pedal is depressed, the lever 112 is comparably actuated so that the governor 111 is set to call for and maintain a correspondingly higher speed of rotation of the engine 6. This is accomplished by a lever 115 in the governor, usually actuated by fly-balls and through a rod 114 joined to the lever 116 of the carburetor throttle 19. With this structure the engine speed 6 is made responsive to the position of the pedal 73.

The pedal position is a relatively accurate indication of the requirement of the vehicle driver, that is the demand that he makes upon his vehicle. Since the connection between the pedal 73 and the governor 111 and the carburetor 19 is substantially direct, there is very slight time lag between the imposition of a demand upon the system by depression of the pedal 73 and the response to that demand by a correspondingly increased speed of the engine 6. When the pedal 73 is released, the engine 6 quickly thereafter loses speed and returns to its idling condition. The shaft 11 representing the output of the engine operates at variable speeds substantially in accordance with and promptly responsive to the demand made upon the plant by the operator. The pumps, air 54, water 39, and fuel 47 and the fan 106, being directly driven by the shaft, also follow the demand upon the vehicle by varying their speed as the engine speed 6 varies.

Unfortunately, due to various circumstances such as different operating characteristics, different temperature conditions, different resistances in the lines from time to time, wear and leakage in the pumps, differences and variations in the fluids being pumped and otherwise, it is not practicable to afford an accurately metered supply of liquid from the pump 39, air from the pump 54, and fuel from the pump 47 to produce anything like a regulated output from the generator 33. We consequently provide some means for regulating the supply of water and fuel to the generator in addition to the general correspondence or relationship imposed by the common drive shaft 11 responsive generally to demand, in order to produce steam of substantially standard characteristics under most circumstances, say of 900 degrees F. temperature and 1500 pounds per square inch pressure.

In the instance of the water pump 39, the control takes the form of an inlet valve 121 which can be operated normally by the pressure differential of the pump in the usual fashion and can also be mechanically lifted so that it does not function and the pump 39 then simply runs idly. A scheme of this sort is shown in the patent to Warren Doble No. 1,474,894. Since the power necessary to actuate the inlet valve 121 and thus disable the pump is relatively large and since it is commercially desirable to reduce the electrical load of the system as much as possible, we provide a vacuum actuated diaphragm 122 for directly actuating the valve 121. The vacuum mechanism 122 is conveniently supplied with subatmospheric pressure through a pipe 123 extending to the inlet manifold 21 adjacent the carburetor 18. Thus when the engine 6 is operating, there is a copious supply of power for minor duties such as operating the valve 121. While the vacuum mechanism can be mechanically controlled, we prefer to provide an electrical solenoid 125 as a controller effective to connect the vacuum mechanism 122 to the low pressure source or to connect it to the atmosphere.

The solenoid 125 in its turn is connected by a wire 124 to a master electrical control 126. This control comprises electrical switches responsive to pressure and temperature conditions within the generator 33 particularly pressure and temperature adjacent the outlet 36 of the steam generated therein. The master controller 126 is provided with electricity through a conductor 127 extending to the main switch 28 so that as soon as the main switch 28 is closed to supply ignition current to the engine 6, current is likewise supplied to the master controller 126. Thus in response to pressure or temperature conditions within the generator, the solenoid 125 is energized or deenergized, the vacuum mechanism 122 is effective or ineffective. As the valve 121 is so actuated or disabled, the pump 39 is effective to supply water through the pipe 42 or to withhold it. The control of the water is thus both an intermittent or off and on control and also a continuous, variable control depending upon the speed of the shaft 11 representing system demand.

The fuel discharged by the pump 47 (driven by the shaft 11 approximately in accordance with the system demand) may by-pass from the duct 49 through a valve 128 into a return pipe 129 extending to the reservoir 46. When the valve 128 is open, the fuel is short circuited to the reservoir and is not forced into the valve 51a. The fuel valve 128 is actuated by a vacuum mechanism 131 connected by a pipe 132 to the pipe 123 and is controlled by a solenoid 134 joined by a conductor 136 to the control 126, preferably to a temperature switch therein. The fuel supply is intermittently off and on as a close control while the general amount of fuel is approximately regulated by the speed of operation of the pump 47. For simultaneous ignition control, it is convenient to provide a conductor 137 extending from the conductor 136 to a coil 138 and ignition breaker and distributor 139. The breaker and distributor is driven from the pump shaft 51 and supplies high voltage electricity through a conductor 141 to the spark plug 63. There is thus provided an off and on, temperature or temperature and pressure controlled, and demand regulated supply of fuel to the valve 51a for transmission to the nozzle 52a.

While this fuel supply regulation is roughly sufficient, there are other factors which make advsisable even a more accurate and delicate control. These factors are variations from time to time in the quality of fuel itself, variations in fuel viscosity with temperature, variations in nozzle discharge characteristics, and variations in the character of combustion desired. For those and other reasons, the fuel valve 51a is connected by a rod 142 to the rod 114. This provides governor operation of the valve 51a so that the valve 51a is operated according to the response of the engine 6 to the operations demands. The valve 51a imposes the final control of the fuel discharging from the nozzle 52a in an amount with respect to the air flowing through the blower outlet 57 to provide the desired combustion.

In addition to controlling the flow of fuel by means of the valve 128 in response to generator conditions, we provide an air control as well, since the blower rotor 59 revolves continuously with the engine 6 while the air flow is preferably intermittent in time with the fuel flow. Within the duct 53 is disposed a pivoted damper 143, actuated by a rod 144 extending to a vacuum mechanism 146 connected through a duct 147 to the pipe 132. A vacuum controlling solenoid 148 is joined to the control box 126 so that the air damper 143 is open when the fuel by-pass valve 128 is closed and vice versa.

In general all of the various auxiliary mechanisms are driven from the engine 6 and according to their individual characteristics correspond approximately in their operation to the speed of operation of the engine. Since the loads, for example those of the blower and of the water pump 39, are intermittent in character, they might vary the speed of the engine 6 unduly except for the fact that the governor 111 maintains the speed of the engine 6 in accordance with the position of the pedal 73, with only relatively slight correctional delays. Thus the entire auxiliary system operates intermittently and with a wide range of speed variation in accordance generally with the position of the pedal 73 and of the throttle 72.

There is an exceptional circumstance when the power plant is first being started from cold. While the system as described operates satisfactorily, it is relatively slow. For that reason, we provide within the master control box 126 a specially responsive switch which is closed when the temperature of the generator is very low, for example atmospheric temperature. The special switch remains closed until the generator temperature exceeds an intermediate value, say 750 degrees F., when the nominal operating temperature is 900 degrees F. When the main switch 28 and the special low temperature switches are closed, current flows through a conductor 151 into a solenoid 152. When it is energized, the solenoid translates the control rod 142 into substantially half open position. The governor 111 is set at half speed condition, the engine throttle 19 is opened to half way position, and the fuel valve 51a is opened to half speed condition as well. When the engine 6 is started by momentary closure of the switch 31, it immediately comes to half speed so that the water pump 39 and the air blower 54 are driven at half speed and the fuel pump 47 is similarly driven. Instead of "steaming up" at idling speed or relatively slowly, the plant is steamed up approximately at a 100 horsepower output rate. That makes it very quickly available at least for partial operation.

As the temperature rises and attains 750 degrees, the special switch in the master control 126 then opens the circuit to the solenoid 152. The governor 111 is thereby restored to its idling condition and the engine 6 drops back to idling speed so that the pumps 39 and 47 and the blower 54 operate relatively slowly to bring the plant from 750 degrees up to its final temperature of 900 degrees. This special control is also effective if by some mischance the remaining control should fail and the temperature should drop far below its nominal 900 degree value. A moderate accidental drop from 900 to 750 degrees is restored by the usual operation of the plant but a severe drop below 750 degrees is quick and effectively restored as the plant, if running slowly, is speeded up to half rate operation.

The independent source of power provided by the engine 6 not only drives the auxiliaries more efficiently than they can be driven by steam, not only affords copious auxiliary mechanical power, not only provides waste heat that can be recovered, not only is quickly responsive to operator demand rather than vehicle motion, and not only supplies incidentals such as vacuum and electricity, but also is taken advantage of in operation of the oil pump 23. This pump takes care of the usual lubrication requirements of the engine 6 and in addition is provided with a discharge conduit 156, leading to branches extending to each of the engines 78 and 79 as well as to the engines 87 and 92. The steam engines are thus supplied with oil under pressure as soon as the internal combustion engine 6 starts. The vehicle engines are partially warmed and are thoroughly lubricated before a load is imposed upon them and they are supplied with lubricant under pressure all the time engine 6 is operating. Branched return lines 157 from the rear engines and 158 from the forward engines join a conduit 159 extending back to the crank case 7 of the engine 6. These return lines carry back oil which has served its purpose in the engines of the vehicle. Additionally, water of condensation, which may have mixed with the lubricating oil in the steam engine, is likewise brought back with the returning oil through the conduit 159. Being discharged into the engine crank case 7, it is removed along with other diluents by the crank case ventilating system normally provided on the engine 6.

We claim:

1. A steam power plant comprising a steam generator, a steam engine, an operator-controlled throttle for regulating the flow of steam from said generator to said steam engine, means for supplying heat to said generator, a prime mover operable independently of said generator and of said engine for operating said supplying means, and means for simultaneously regulating said throttle and said prime mover.

2. A steam power plant comprising a steam generator, a steam engine means for connecting said generator to supply steam to said steam engine, a throttle for governing said supply, a condenser for steam from said engine, a fan for blowing cooling air over said condenser, an engine operable independently of said generator for driving said fan, and an operator-controlled regulator for simultaneously operating said throttle and correspondingly regulating said independent engine.

3. A steam power plant comprising a steam generator, a steam engine adapted to receive a flow of steam from said generator, means for governing said flow, means for supplying said generator with liquid and with materials for combustion, an engine operable independently of said generator for operating said supplying means, means for simultaneously and correspondingly operating said governing means and said independent engine, and means responsive to pressure and temperature conditions in said generator for regulating said supplying means.

4. A steam power plant comprising a steam generator, a steam engine adapted to receive a flow of steam from said generator, means for governing said flow, a condenser for receiving a flow of steam from said engine, a fan for cooling said condenser, a pump for transferring condensate from said condenser to said generator, an engine operable independently of said generator for driving said fan and said pump, and means for simultaneously operating said governing means and said independent engine in a corresponding relationship to each other.

5. A steam power plant comprising a steam generator, means for supplying said generator with a liquid, an internal combustion engine operable independently of said generator for driving said supplying means, said engine providing a source of vacuum during its operation, means operated by vacuum for disabling said supplying means, and means for connecting said disabling means to said source of vacuum.

6. A steam power plant comprising a steam generator, means for supplying said generator with a material for combustion, an internal combustion engine operable independently of said generator for driving said supplying means, said engine providing a source of vacuum during its operation, means operated by vacuum for disabling said supplying means, and means for connecting said disabling means to said source of vacuum.

7. A steam power plant comprising a steam generator, means for supplying said generator with materials for combustion, an internal combustion engine operable independently of said generator for driving said supplying means, a manually operated means for changing the speed of said internal combustion engine, and means responsive to temperature conditions in said generator for additionally operating said means for changing the speed of said internal combustion engine.

8. A steam power plant comprising a steam generator, means for supplying said generator with materials for combustion, an internal combustion engine for driving said supplying means, said engine having an electrical ignition system, electrical means for regulating said supplying means, and a switch for simultaneously controlling said ignition system and said regulating means.

9. A steam power plant comprising a steam generator, a throttle for controlling the outflow from said generator, an internal combustion engine operable independently of said generator, a pump driven by said engine for intermittently supplying said generator with materials for combustion and during said intermittent supply correspondingly imposing an intermittent load on said engine, a governor responsive to the speed of said engine and settable to regulate the speed of said engine at any selected value independently of the load thereon, and manually controlled means for operating said throttle and correspondingly setting said governor.

10. A steam power plant comprising a steam generator, a steam engine connected to receive a flow of steam from said generator, a steam throttle variable to control said flow of steam, an internal combustion engine operable independently of said generator, a fuel valve on said internal combustion engine variable to control the speed of said internal combustion engine, fuel and air pumps mechanically driven by said internal combustion engine and connected to supply a combustible mixture to said steam generator, a controller movable by an operator, and connections between said controller and said steam throttle and said fuel valve for moving said steam throttle and said fuel valve simultaneously with movement of said controller.

11. A steam power plant comprising a steam generator, means for supplying said generator with a liquid, means for supplying said generator with materials for combustion, an internal combustion engine operable independently of said generator for driving both of said supplying means, means responsive to pressure and temperature conditions in said generator for reducing the loads imposed upon said engine by said supplying means, and a governor responsive to the speed of said engine for rendering the reduction of said loads substantially ineffective upon the operating speed of said engine.

12. A steam power plant comprising a steam generator, a movable throttle for controlling steam flow from said generator, means for supplying said generator with a liquid, means for supplying said generator with materials for combustion, an internal combustion engine operable independently of said generator for driving both of said supplying means, means for intermittently reducing the loads imposed upon said engine by said supplying means, and means for governing the speed of said engine substantially in accordance with the movement of said throttle despite the intermittent reduction of said loads upon said engine.

ROBERT L. HARRIS.
MARCUS LOTHROP.

REFERENCES CITED

The following references are of record in the file of this patent:

UNITED STATES PATENTS

| Number | Name | Date |
| --- | --- | --- |
| 782,624 | Rey et al. | Feb. 14, 1905 |
| 854,048 | Lemp | May 21, 1907 |
| 1,015,848 | Silliman | Jan. 30, 1912 |
| 1,288,557 | Gates | Dec. 24, 1918 |
| 1,489,501 | Miner, Jr. | Apr. 8, 1924 |
| 1,551,438 | Staley | Aug. 25, 1925 |
| 1,664,329 | Staley | Mar. 27, 1928 |
| 1,819,186 | Mayr | Aug. 18, 1931 |
| 1,927,204 | Doble | Sept. 19, 1933 |
| 1,927,205 | Doble | Sept. 19, 1933 |
| 1,961,395 | Schlobohm | June 5, 1934 |
| 2,112,750 | Price | Mar. 29, 1938 |
| 2,197,651 | Rosch | Apr. 16, 1940 |
| 2,204,138 | Knowlton | June 11, 1940 |
| 2,235,541 | Warren | Mar. 18, 1941 |
| 2,279,037 | Endsley | Apr. 7, 1942 |
| 2,379,887 | Doble | July 10, 1945 |
| 2,456,076 | Ofeldt | Dec. 14, 1948 |